Dec. 31, 1957   J. B. WHITTON   2,818,120
EXPANSION PLUG
Filed July 11, 1956
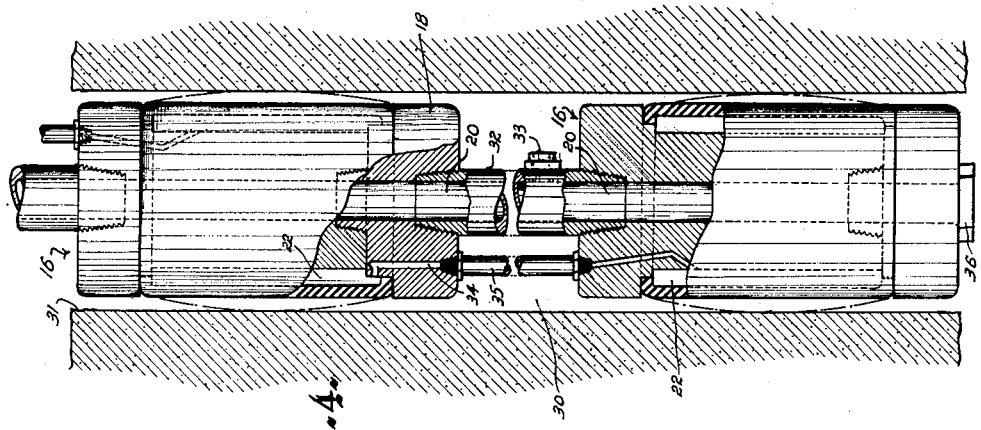
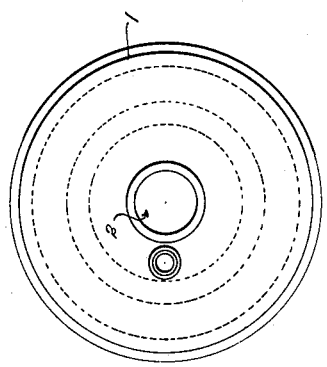
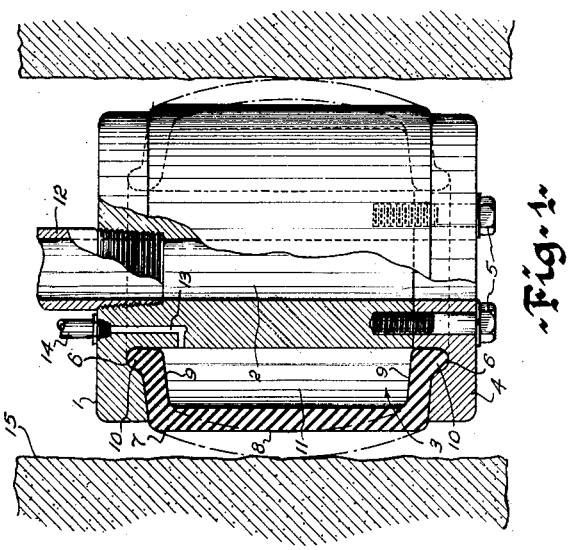
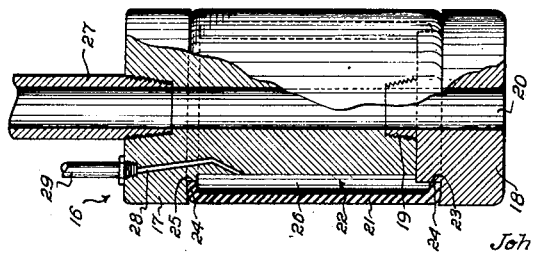
Inventor:
John Bartholomew Whitton
By Alex. E. MacRae
Attorney.

United States Patent Office 2,818,120
Patented Dec. 31, 1957

2,818,120
EXPANSION PLUG

John Bartholomew Whitton, Renfrew, Ontario, Canada

Application July 11, 1956, Serial No. 597,123

3 Claims. (Cl. 166—187)

This invention relates to expansion plugs for openings such as bore holes and the like.

There are many instances where it is desirable to rigidly position a plug in a required location in a bore hole, pipe or the like. Thus, in the construction industry, it is common practice to provide bore holes in the earth or rock and to fill such holes with grout. For this purpose, it is usual to rigidly locate a plug in a plurality of successive positions in the bore hole to constitute a support for a grout line from a pump.

Expansion plugs presently available for this purpose are not completely satisfactory in that they are somewhat expensive, awkward to handle, and are not positively effective.

An object of this invention is to provide an expansion plug which is of convenient and inexpensive manufacture, and which may be quickly, easily and positively locked in any selected position in an opening, hole or the like.

The invention comprises the provision of a plug having an annular recess in the side surface thereof, a flexible ring seated in such recess and constituting one wall of a closed annular space in the recess, the opposed wall of said annular space being constituted by a wall of the recess, and means for admitting fluid under pressure to such annular space to expand the flexible ring.

The invention will be described with reference to the accompanying drawing, in which—

Figure 1 is a side elevation of a plug in accordance with the invention,

Figure 2 is a plan view of the plug shown in Figure 1,

Figure 3 is a side elevation of somewhat modified form of plug, and

Figure 4 is a side elevation of an arrangement of test plugs in accordance with the invention.

Referring to Figures 1 and 2, the expansion plug in accordance with the invention comprises a cylindrical body member 1 having an axial bore 2 and an annular recess 3 in its exterior side surface. The recess 3 is generally rectangular in cross-section, as shown, and has a length occupying the major portion of the length of the body 1 and a depth occupying the major portion of the thickness of the wall of the body member.

One end portion 4 of the member 1 is separable from the main portion thereof and is fixed to such main portion as by bolts 5. Recess 3 extends slightly into portion 4. An annular groove 6 is formed in each end wall of recess 3 adjoining the bottom wall thereof. One of the grooves 6 is thus formed in portion 4.

Seated in recess 3 is a flexible ring 7 of rubber, rubber fabric, plastic composition or the like. Ring 7 has a normally substantially flat or slightly curved side wall 8 of major extent, end walls 9 engaging the end walls of the recess, and an outwardly extending rim or bead 10 at the periphery of each end wall fitting into a complementary groove 6. It will be apparent that the ring 7 is clinched into the recess 3, the rims 10 retaining the ring in place therein by reason of their engagement with the grooves 6. The exterior diameter of the ring 7 is at least as great as that of the body member 1 and is preferably of slightly larger diameter as shown. It will be observed that the ring 7 in association with recess 3 forms a closed space or chamber 11.

One end of the bore 2 is connected by means of a nipple or coupling 12 to the outlet conduit of a pump.

The closed chamber 11 is connected to a source of fluid under pressure, such as air or hydraulic liquid, by means of a passage 13 and conduit 14.

In use, the device is positioned in a bore hole, as indicated at 15, at any desired location therein. Fluid is then forced into chamber 11 to expand or distend the ring 7 to a position such as indicated in dotted lines in Figure 1. The ring thus tightly grips the wall of the bore hole to rigidly lock the plug in position therein. Material such as grout is then pumped through the bore 2 into the bore hole.

Referring to Figure 3, the plug 16 therein illustrated is designed for use in bore holes of somewhat smaller diameter than that shown in Figure 1. As shown, a body member 17 has a separable end portion 18 which is screwthreaded to the main body portion by means of a threaded axial boss 19, through which the axial bore 20 extends. A flexible ring 21 is seated in an annular recess 22 in the exterior surface of body member 17. The end wall of the recess in the end portion 18 is formed with a shoulder 23 against which one rim 24 of the ring 21 abuts. The other end wall of the recess is formed with a shoulder 25 against which the other rim 24 of the ring 21 abuts. The ring forms with the recess a closed chamber 26. The bore 20 is connected by means of a pipe connection 27 with the output of a pump. The chamber 26 is connected to a source of fluid under pressure by means of a passage 28 in the body member and a conduit 29.

Figure 4 illustrates an embodiment of the invention wherein a pair of expansion plugs 16 are connected in tandem to provide a closed localized portion 30 of a bore hole or other opening 31 whereby such portion 30 may be subjected to tests for various purposes. The bores 20 of the two plugs are connected by a pipe 32, which may be provided with an outlet 33 between the plugs. The recess 22 in the upper plug is in communication with the recess 22 in the lower plug through a passage 34 in the end portion 18 of the upper plug and a conduit 35 connected to the passage 28 in the lower plug. The lower end of the bore in the lower plug may be closed by a cap 36.

It will be apparent that any suitable fluid under pressure may be forced into any selected portion 30 of an opening to pressure test the same.

The form of the invention shown in Figure 4 may be used for many purposes. For instance, the localized area may be water tested to check rock porosity for fractures, seams, and the like. Moreover, the device may be employed for grouting individual seams or localized areas.

There has thus been provided a simple expansion plug capable of convenient and varied use. It will be observed that the inlet for pressure fluid into the chamber 11 or 26 is in the surface of the body member and not through the flexible ring 7 or 21, and thus no problem is involved in providing passages in a flexible manner. Moreover, the structure described permits the use of a maximum length of expansible ring without movement of any part of the body member during expansion of the flexible ring. Furthermore, the amount of pressure utilized in the expansion of the ring may be chosen to suit any particular operation in which the plug is employed. As a result, the plug will be held rigidly and positively in any desired location. It will be apparent that a plug of appropriate overall diameter will be chosen for use in each hole or opening of a particular diameter.

I claim:

1. An expansion plug comprising a substantially cylindrical body member having a separable end portion fixed thereto, said body member having an annular recess in the side surface thereof, said recess having a length occuping the major portion of the length of said body member, said recess having side and end walls constituted by surfaces of said body member, each said end wall having an annular groove therein, and a flexible ring in said recess and having a rim seated in each of said grooves, said ring forming one wall of a closed annular chamber in said recess, the opposed wall of said annular chamber being constituted by said side wall of said recess, said body member having an axial bore therein for delivery of material therethrough and an unobstructed passage for fluid having an inlet in one end of said body member and an outlet in said recess side wall.

2. An expansion plug as defined in claim 1, one of said recess end walls and one of said grooves being formed in said separable end portion of said body member.

3. An expansion plug comprising a substantially cylindrical body member having an annular recess in the side surface thereof, said recess having a length occupying the major portion of the length of said body member, said recess having side and end walls constituted by surfaces of said body member, a flexible ring in said recess and having edge portions seated on the end walls of said recess, said body member having a separable end portion fixed thereto, said separable end portion having an inner surface forming the surface of said body member constituting one end wall of said recess to facilitate mounting of said flexible member in said recess, said ring forming one wall of a closed annular chamber in said recess, the opposed wall of said annular chamber being constituted by said side wall of said recess, said body member having an axial bore therein for delivery of material therethrough and an unobstructed passage for fluid having an inlet in one end of said body member and an outlet in said recess side wall.

References Cited in the file of this patent

UNITED STATES PATENTS

| | | |
|---|---|---|
| 2,286,365 | Lane | June 16, 1942 |
| 2,671,510 | Slick et al. | Mar. 9, 1954 |
| 2,741,313 | Bagnell | Apr. 10, 1956 |
| 2,751,016 | Watzlavick | June 19, 1956 |